(12) United States Patent
Munch et al.

(10) Patent No.: US 9,550,182 B2
(45) Date of Patent: Jan. 24, 2017

(54) METHOD FOR THE PRODUCTION OF AN SCR-ACTIVE ZEOLITE CATALYST, AND SCR-ACTIVE ZEOLITE CATALYST

(75) Inventors: Jorg Werner Munch, Lichtenfels (DE); Ralf Dotzel, Nuremberg (DE)

(73) Assignee: Johnson Matthey Catalysts (Germany) GMBH, Redwitz (DE)

( * ) Notice: Subject to any disclaimer, the term of this patent is extended or adjusted under 35 U.S.C. 154(b) by 1036 days.

(21) Appl. No.: 13/392,960

(22) PCT Filed: Aug. 21, 2010

(86) PCT No.: PCT/EP2010/005140
§ 371 (c)(1),
(2), (4) Date: Apr. 23, 2012

(87) PCT Pub. No.: WO2011/026573
PCT Pub. Date: Mar. 10, 2011

(65) Prior Publication Data
US 2012/0208692 A1    Aug. 16, 2012

(30) Foreign Application Priority Data

Sep. 5, 2009   (DE) .................. 10 2009 040 352

(51) Int. Cl.
| | |
|---|---|
| *B01J 29/06* | (2006.01) |
| *C01B 39/00* | (2006.01) |
| *B01J 37/16* | (2006.01) |
| *B01J 29/072* | (2006.01) |
| *B01D 53/94* | (2006.01) |
| *B01J 29/46* | (2006.01) |
| *B01J 29/72* | (2006.01) |
| *B01J 37/08* | (2006.01) |
| *B01J 37/12* | (2006.01) |
| *B01J 37/14* | (2006.01) |
| *B01J 37/18* | (2006.01) |

(52) U.S. Cl.
CPC ............ *B01J 37/16* (2013.01); *B01D 53/9418* (2013.01); *B01J 29/072* (2013.01); *B01J 29/46* (2013.01); *B01J 29/7215* (2013.01); *B01J 37/084* (2013.01); *B01J 37/12* (2013.01); *B01D 2251/2062* (2013.01); *B01D 2255/20738* (2013.01); *B01D 2255/50* (2013.01); *B01D 2255/502* (2013.01); *B01D 2255/504* (2013.01); *B01J 37/14* (2013.01); *B01J 37/18* (2013.01); *B01J 2229/186* (2013.01); *B01J 2229/30* (2013.01); *B01J 2229/40* (2013.01)

(58) Field of Classification Search
USPC ................. 502/66, 69, 74, 77, 85; 423/700
See application file for complete search history.

(56) References Cited

U.S. PATENT DOCUMENTS

| | | | |
|---|---|---|---|
| 4,085,193 A | 4/1978 | Nakajima et al. | |
| 4,961,917 A | 10/1990 | Byrne | |
| 5,271,913 A | 12/1993 | Iida et al. | |
| 5,417,949 A | 5/1995 | McWilliams et al. | |
| 5,589,147 A | 12/1996 | Farnos et al. | |
| 6,569,394 B2 * | 5/2003 | Fischer ............. B01D 53/8628 | 423/239.1 |
| 2002/0039550 A1 | 4/2002 | Schafer-Sindlinger et al. | |
| 2006/0147362 A1 | 7/2006 | Nissinen et al. | |
| 2007/0259770 A1 | 11/2007 | Hofmann et al. | |
| 2008/0044334 A1 * | 2/2008 | Pieterse et al. ............ 423/239.2 | |

FOREIGN PATENT DOCUMENTS

| | | | |
|---|---|---|---|
| DE | 19854502 | * | 5/2000 |
| EP | 0219854 | | 4/1987 |
| JP | 2007222742 A | | 9/2007 |
| JP | 2008212799 A | | 9/2008 |
| JP | 2011509826 | | 3/2011 |
| JP | 2011510899 | | 4/2011 |
| RU | 2264852 C1 | | 11/2005 |
| WO | 2008132452 A2 | | 11/2008 |
| WO | 2009093071 A1 | | 7/2009 |
| WO | 2009099937 A1 | | 8/2009 |

OTHER PUBLICATIONS

Othmer et al., Encyclopedia of Chemical Technology, 3rd Ed., vol. 15, John Wiley & Sons, New York, 1981, p. 640-669.*
Notification of Transmittal of Translation of the International Preliminary Report on Patentability; Mailed Mar. 22, 2012 for corresponding PCT Application No. PCT/EP2010/005140.
International Search Report for PCT/EP2010/005140, Mailing Date: Feb. 4, 2011 (10 pages).
Qi et al.; Ultra-active Fe/ZSM-5 catalyst for selective catalytic reduction of nitric oxide with ammonia; Applied Catalysis B: Environmental 60 (2005) 13-22; Available online Mar. 16, 2000.
Battiston et al.; Reactivity of binuclear Fe complexes in over-exchanged Fe/ZSM5, studied by in situ XAFS spectroscopy 2. Selective catalytic reduction of NO with isobutane; Journal of Catalysis 218 (2003) 163-177; Mar. 3, 2003.
Barrer, R.M.; Chemical Nomenclature and Formulation of Compositions of Synthetic and Natural Zeolites; Pure & Appi. Chem., vol. 51, pp. 1091-1100; Pergamon Press Ltd. 1979. Printed in Great Britain.
Baerlocher et al.; Zeolite Atlas: Atlas of Zeolite Framework Types, 5th edition, Amsterdam, Elsevier (2001).

* cited by examiner

*Primary Examiner* — Elizabeth Wood

(57) ABSTRACT

An SCR-active zeolite catalyst and a method for producing same. To produce the catalyst, an Fe ion-exchanged zeolite is initially subjected to a first temperature treatment within a range of 300 to 600° C. in a reducing hydrocarbon atmosphere such that the oxidation state of the Fe ions decreases and/or the dispersity of the Fe ions on the zeolite increases, whereupon the reduced zeolite is subjected to a second temperature treatment within a range of 300 to 600° C. in an oxidizing atmosphere such that hydrocarbon residues or carbon residues are oxidatively removed, the zeolite being calcined to obtain a catalyst material during the two temperature treatments. Iron contained in the zeolite is stabilized in an oxidation state of less than +3 and/or the dispersity of the Fe ions on the zeolite is permanently increased such that a high SCR activity is achieved within a temperature range of less than 300° C.

15 Claims, 2 Drawing Sheets

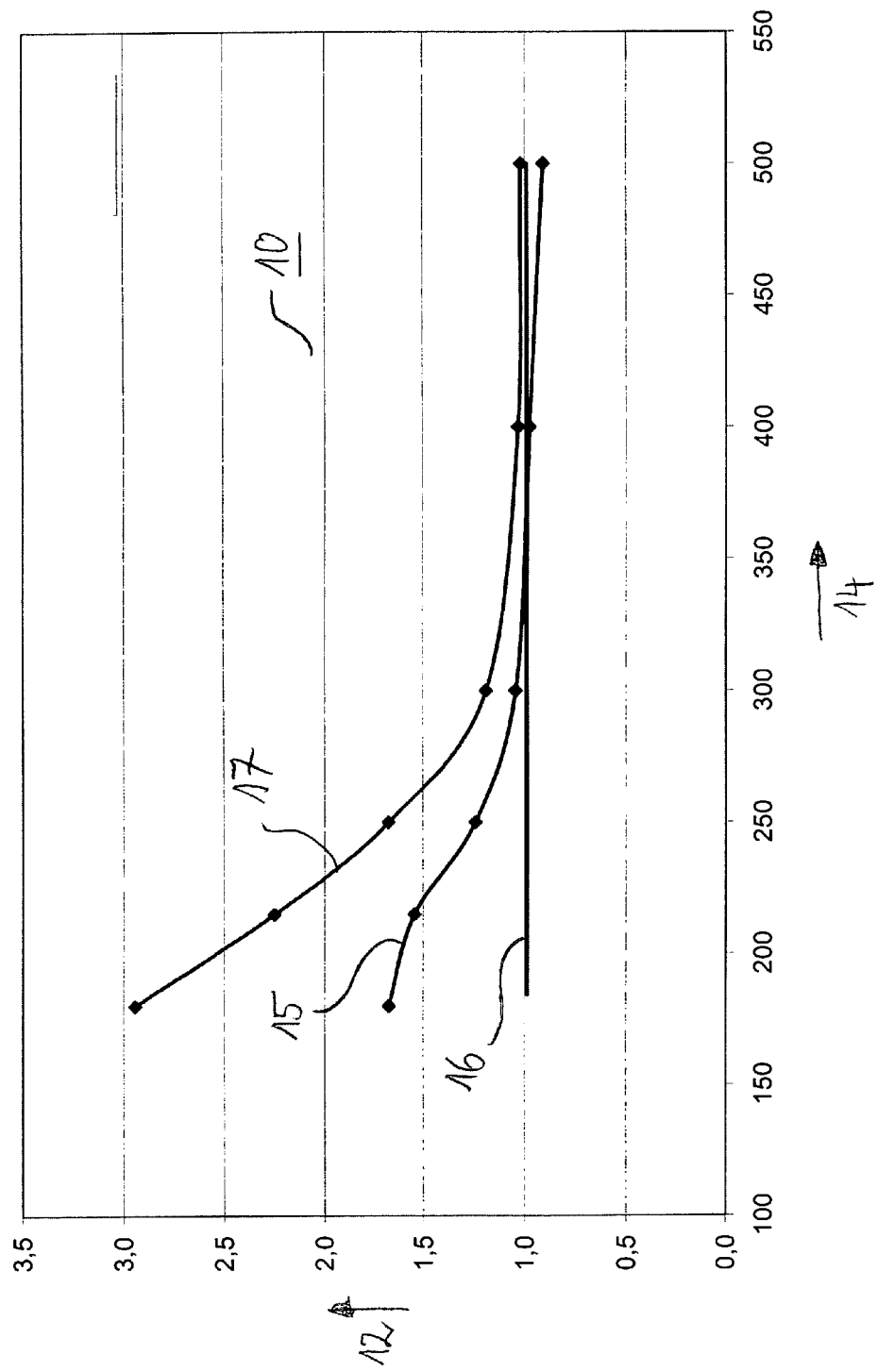

METHOD FOR THE PRODUCTION OF AN SCR-ACTIVE ZEOLITE CATALYST, AND SCR-ACTIVE ZEOLITE CATALYST

FIELD OF THE INVENTION

The invention relates to a process for producing an SCR-active zeolite catalyst. The invention further relates to an SCR-active zeolite catalyst. The invention is concerned with the problem of the relatively low SCR activity of a zeolite catalyst in the low-temperature range below 300° C. if only a small amount of $NO_2$, if any, is present in the exhaust gas.

BACKGROUND OF THE INVENTION

For removal of nitrogen oxides in an oxygen-containing exhaust gas, such as that of an internal combustion engine operated with excess air, especially from a diesel engine, catalysts based on titanium dioxide are known, over which the nitrogen oxides are reduced in the presence of oxygen by means of an added reducing agent, such as ammonia in particular, to give molecular nitrogen and water. In this regard, reference is made by way of example to DE 24 58 888 A1. In this process for selective catalytic reduction, SCR process for short, the reducing agent or a precursor substance which is converted to the reducing agent in the exhaust gas is added to the exhaust gas prior to entry into the catalytic converter. For example, a known precursor substance for the reducing agent ammonia is urea, which is supplied to the exhaust gas especially in the form of an aqueous urea solution. Also known as alternative reducing agents are hydrocarbons which, especially in the case of incomplete combustion in the internal combustion engine, may already be present as combustion products in the exhaust gas.

The SCR-active catalysts known from DE 24 58 888 A1 comprise a ceramic catalyst composition comprising titanium dioxide as the main constituent, with additions of oxides of tungsten and/or vanadium. The catalyst bodies used here may be coated catalysts or unsupported catalysts. In the coated catalysts, the catalyst composition has been applied to a support material, such as more particularly to a cordierite (a magnesium aluminosilicate of the composition $Mg_2Al_4Si_5O_{18}$ with rhombic dipyramidal structure) which is itself catalytically inactive. An unsupported catalyst, in contrast, is manufactured entirely from the catalytically active catalyst composition. For this purpose, the starting materials are generally processed to give a kneadable slurry, which is extruded to give a honeycomb permeated by channels. Subsequently, the extruded honeycomb is calcined with solidification by a thermal treatment to give the finished unsupported catalyst.

Further known constituents of SCR-active catalysts are also zeolites. Zeolites, i.e. framework aluminosilicates, in some cases form a structure permeated by channels of a diameter in the order of magnitude of gas molecules and, due to their high specific surface area, are especially suitable for a selective catalytic reduction.

For instance, DE 198 54 5502 A1 discloses an SCR-active catalyst for degradation of nitrogen oxides in the presence of a reducing agent having an active composition comprising titanium dioxide and a zeolite, said zeolite being a hydrogen ion-exchanged, acidic zeolite.

GB 2 193 655 A also discloses a catalyst for degradation of nitrogen oxides by the SCR process. The catalyst composition of the catalyst specified therein comprises a titanium dioxide with low specific surface area and a copper-containing zeolite obtained by ion exchange. Preferred zeolites specified are mordenite, ZSM-5 and ferrierite.

Also known from EP 0 393 917 A2 is a catalyst for degradation of nitrogen oxides, the catalyst composition of which comprises a zeolite which, after ion exchange, contains copper and/or iron. Preferred zeolites specified are USY (Ultra Stabilized Y), beta and ZSM-20.

In addition, EP 0 219 854 A2 discloses a catalyst which comprises titanium dioxide in the anatase polymorph and an acid-stabilized zeolite in the hydrogen form or in the ammonium form.

Finally, U.S. Pat. No. 5,271,913 A discloses a catalyst for degradation of nitrogen oxides by the SCR process, the catalyst composition of which comprises a zeolite. The zeolite here is impregnated with cerium oxide or iron oxide. The catalyst specified is said to have a high stability with respect to sulfur-containing components. A preferred zeolite specified is a zeolite of the ZSM-5 type.

Zeolite catalysts can be produced either in the form of coated catalysts or in the form of unsupported catalysts. The configuration of a zeolite catalyst as a bulk material catalyst, particularly in the form of pellets, is also known per se.

The literature mentions an Fe ion-exchanged zeolite in particular with regard to its good SCR activity. For example, the publication "Ultra-Active Fe/ZSM-5 Catalyst For Selective Catalytic Reduction Of Nitric Oxide With Ammonia", Gongshin Qi, Ralph T. Yang, Apple. Cat. B: Environmental 60 (2005) 13-22 studies the SCR activity of an Fe ion-exchanged ZSM-5 zeolite for $NO$, and conversion rates of $NO$ close to 90% are achieved at temperatures above 350° C. in the presence of ammonia. The ion exchange of the zeolite of the ZSM-5 type studied is undertaken by impregnation by means of $FeCl_3$. The calcination of the catalyst composition takes place under oxidizing atmosphere in air. By means of X-ray diffraction and electron spin resonance measurements, the oxidation state of the iron ion incorporated into the zeolite structure is determined to be +2 and/or +3. It is suspected that iron with the +2 oxidation state in particular is responsible for a high catalytic activity. During the SCR reaction studied, iron of the +2 oxidation state is gradually oxidized.

In the prior publication "Structure/Reactivity Correlation In Fe/ZSM5 For DENOx Applications. In-situ XAFS Characterization And Catalysis", A. A. Battiston, J. H. Bitter, D. C. Koningsberger, Elsevier, an Fe ion-exchanged zeolite of the ZSM-5 type is also studied with regard to its SCR activity. In this case, particularly the coordination site of the iron ion incorporated into the zeolite structure is analyzed by means of X-ray spectroscopy methods. The ZSM-5 zeolite studied is ion-exchanged by means of $FeCl_3$ sublimation. The SCR activity of the calcined catalyst composition is analyzed using butane and isobutane as reducing agents. The catalyst composition is studied by X-ray spectroscopy in each case after treatment with oxygen, carbon monoxide and isobutane. During the SCR reaction, the oxidation state of the iron ion incorporated is said to be reduced.

SUMMARY OF THE INVENTION

It is an object of the invention to specify a process for producing an SCR-active zeolite catalyst which, particularly within a low temperature range, has a comparably high and lasting SCR activity, even if only a small amount of $NO_2$, if any, is present in the exhaust gas. It is a further object of the invention to specify a zeolite catalyst provided with the properties mentioned.

The object with regard to the production process is achieved in accordance with the invention by first subjecting an Fe ion-exchanged zeolite in a reducing hydrocarbon atmosphere to a first thermal treatment within a range between 300° C. and 600° C., which reduces the oxidation state of the Fe ions and/or increases the dispersity of the Fe ions on the zeolite, then subjecting the reduced zeolite in an oxidizing atmosphere to a second thermal treatment between 300° C. and 600° C., which oxidatively removes hydrocarbon residues and/or carbon residues, and calcining the zeolite during the first and second thermal treatments to give a catalyst.

Extensive in-house studies have substantiated the hypothesis that an Fe ion-exchanged zeolite has an elevated SCR activity when the oxidation state of the iron ions incorporated is less than +3 and/or the dispersity of the Fe ions on the zeolite is increased. Dispersity is understood here to mean the degree of distribution of the Fe ions on the zeolite. A high dispersity indicates a fine distribution. A low dispersity suggests the presence of Fe clusters on the zeolite.

Such a zeolite catalyst can in principle, after ion exchange and calcination, be produced, for example, by reducing it under forming gas or by means of CO, which reduces the oxidation state of the iron ions incorporated in the direction of +2, or alters the dispersity.

Under SCR conditions, i.e. in the presence of oxygen, however, the catalytic activity gradually declines. This is combined with a color change in the reduced Fe ion-exchanged zeolite catalyst from a pale yellow to beige base color to a rust-red shade. This suggests that iron in the +2 oxidation state bound to the zeolite is oxidized to iron of the +3 oxidation state, as corresponds to $Fe_2O_3$. The color change to the rust-red shade can also be connected to a decrease in the dispersity of the iron, i.e. to formation of Fe clusters, on the zeolite.

The aim of the invention is thus to produce the Fe ion-exchanged zeolite catalyst with high SCR activity in a lasting manner. After extremely extensive empirical studies, it has been found that such an Fe ion-exchanged zeolite catalyst, where iron is present predominantly with an oxidation state of less than +3 and/or the Fe ions are bound to the zeolite with high dispersity, can be produced in a lasting manner by performing the calcination not as usual in an oxidizing atmosphere, but rather in a reducing hydrocarbon atmosphere.

Due to an as yet undetermined reaction with the hydrocarbons or with decomposition products of the hydrocarbons during the calcining operation within a temperature range between 300° C. and 600° C., iron which is bound to the zeolite and is reduced to a lower oxidation state, especially of +2, and/or fine distribution of the iron on the surface of the zeolite is stabilized. Reoxidation in an oxidizing atmosphere or reformation of Fe clusters on the surface, especially also under SCR conditions and at high temperatures, is blocked. The coordination site of the bound iron cation on the zeolite is highly complex. Neither the exact lattice structure nor the chemical environment of the iron can be determined exactly. More particularly, the oxidation state under these conditions, within the anionic framework of the zeolite, can no longer be considered to be an integer; instead, fractional oxidation states are discussed. Due to the base color established in the catalyst composition calcined under reducing conditions, which is from pale yellow to beige, the mean oxidation state, however, can be reported with a value of less than +3. In other words, the predominant number of the iron ions incorporated should be present with an oxidation state of +2 if integer oxidation states are defined.

Alternatively, the fine distribution of the iron, in contrast to a cluster agglomeration, could also be crucial for the observable color. This is because it has been found, by UV-VIS measurements on appropriately prepared zeolite samples, i.e. on the basis of absorption spectra in the ultraviolet and visible spectral region, that the treatment specified establishes a permanently high dispersity of the iron on the zeolite. While a broad absorption peak between about 250 and 600 nm occurs in UV-VIS spectra in the case of samples produced conventionally without the process step of reducing calcination, a peak shifted to shorter wavelengths with a maximum at about 250 nm, which declines at about 400 nm and undercuts the absorption curve of the comparative sample is observable in the case of catalysts produced by the process specified in the present case. Since, in the present case, absorption at more than 400 nm suggests large iron particles (iron oxide, clusters), absorption at 300 to 400 nm suggest oligomeric Fe clusters, and absorption at 200 to 300 nm suggests iron in tetra- or octahedral coordination, the analysis result indicates an increase in the dispersity of the iron on the zeolite. This dispersity is additionally maintained permanently. The new formation of Fe clusters is blocked.

The zeolite reduced under a hydrocarbon atmosphere is subsequently calcined further in a second thermal treatment between 300° C. and 600° C. in an oxidizing atmosphere, which removes the residues or decomposition products of the hydrocarbons by oxidation. In other words, the hydrocarbons or carbon are burnt. At the same time, further solidification of the catalyst composition takes place, which is crucial for the calcining operation.

Overall, the zeolite, or the catalyst composition comprising the zeolite, is thus calcined in two stages, the zeolite first being reduced in a hydrocarbon atmosphere and then oxidized in an oxidizing atmosphere essentially to remove the organic residues. Since the completed catalyst composition has the pale yellow to beige base color, it has been shown at the same time that reduction in a hydrocarbon atmosphere blocks oxidation of the iron of the +2 oxidation state to iron of the +3 oxidation state and/or a reduction in the dispersity of the iron. The final oxidative calcination does not lead to renewed oxidation of the reduced iron and/or to renewed reduction in the dispersity. Further studies confirm that the catalyst composition produced in accordance with the invention has the desired permanently high SCR activity.

The invention does not have any restriction whatsoever with regard to a specific configuration of the catalyst body. The described calcination in reducing and oxidizing atmosphere can be undertaken either on a zeolite powder or on a zeolite-containing unsupported catalyst, or else particularly on a support body which has been coated or impregnated with the zeolite-containing composition.

It has been found that an unsupported catalyst which has been calcined under reducing conditions and is heated to temperatures up to 900° C. and subjected to an air flow at a space velocity of 10 000 1/h, even after several hours, does not have any color change that would suggest oxidation of the incorporated iron in the reduced form and/or a reduction in the dispersity. Under the same experimental conditions, Fe ion-exchanged conventional zeolites which have been reduced after calcination show a clear color change after only a few minutes.

Further studies have shown that the proportion of iron in the +2 oxidation state present and/or a high dispersity of the iron can be stabilized even better when a temperature of 500° C. is exceeded for a period of more than 50 minutes during the first thermal treatment. It is possible that an activation energy is required to permanently configure or to preserve the coordination site of the iron, i.e. the anionic framework environment of the zeolite. A duration of more than 50 minutes has been found to be advantageous here.

In addition, it has been found to be advantageous for the stabilization or reduction of the bound iron to cool the zeolite at the end of the first thermal treatment to a temperature below 400° C. It has been shown empirically in this context by extensive measurement series that the SCR activity is improved when a cooling step is added to the reducing thermal treatment prior to the oxidation during the second thermal treatment. The best results can be achieved here when the temperature goes below 400° C. during the cooling.

In a further-preferred configuration variant of the invention, the hydrocarbon atmosphere contains less than 1% by volume of oxygen. A higher oxygen content complicates the reduction of the incorporated iron.

With regard to the hydrocarbons, particularly decomposition products of long-chain hydrocarbons are suitable, which form through pyrolysis in the temperature range specified. Particularly suitable starting materials have been found to be especially organic polymers and/or biopolymers. These polymers are also introduced into the furnace during the first thermal treatment. They decompose therein at the corresponding temperatures with exclusion of oxygen to gaseous decomposition products, which then contribute to the hydrocarbon atmosphere. Suitable organic polymers are especially polyethylenes, polyglycols or polypropylenes. Advantageous biopolymers have been found to be polysaccharides, and in this context especially cellulose. However, polyglucosamines and lipids can also be used correspondingly.

A particular option for formation of the hydrocarbon atmosphere required is to perform the first thermal treatment in an inert gas atmosphere, in which case desired hydrocarbons are supplied either directly in gaseous form or by decomposition as described. The inert gas used may especially be nitrogen. However, noble gases are also conceivable.

In a particularly preferred configuration of the invention, the hydrocarbons are added to the zeolite composition prior to the calcination in the form of a reactive precursor. During the first thermal treatment, the reactive precursor decomposes to the desired decomposition products, which then form the hydrocarbon atmosphere. In this configuration, there is no need to supply any additional hydrocarbons during the first thermal treatment. The hydrocarbon atmosphere forms during the thermal treatment by pyrolysis of the precursor molecules present in the zeolite composition.

In a particularly favorable variant of the invention, the zeolite is preliminarily processed with addition of an organic plasticizer to give a free-flowing composition, especially an extrudable composition, the first thermal treatment being performed in an inert gas atmosphere, in such a way that the organic plasticizer releases hydrocarbons into the inert gas atmosphere as a result of pyrolysis. In this way, the organic plasticizer, which is required in any case for production of the extrudable composition, can be used simultaneously for reduction and stabilization of the reduced iron. No further additives are required.

While the organic plasticizer in conventional processes is oxidizing during a calcination step in air, i.e. under an oxidizing atmosphere, and thus removed, pyrolysis of the plasticizer in the inert gas atmosphere now forms decomposition products which are desired for reduction and contribute to or form the hydrocarbon atmosphere. Typically, the plasticizer used is cellulose and polyethylene glycol or polyethylene oxide, individually or in combination. The pulverulent zeolite is first processed together with the plasticizer and optionally with further assistants and fillers, with addition of water, to give the extrudable composition.

In a first alternative, this composition is then extruded to give a honeycomb permeated by channels. Drying of the honeycomb is then followed by the above-described calcining operation. The reducing calcination is followed by the oxidative calcination, the organic residues of the plasticizer and the decomposition products formed being removed by oxidation. The removal of the plasticizer by means of oxidation forms pores in the catalyst body during the calcining operation, which increases the specific surface area.

In a second alternative, the composition produced is applied as a coating to an inert support body, for example cordierite. The coated support body is then subjected to the reducing and oxidizing calcination. The inert support body may also be present, more particularly, as a honeycomb permeated by channels.

It is also conceivable to subject the composition produced to the reducing calcination prior to the further processing thereof.

The calcination can be undertaken in two successive stages. In this case, the zeolite is first thermally treated in a first furnace under a reducing hydrocarbon atmosphere and reduced as a result. Subsequently, the zeolite is withdrawn from the first furnace while cooling and supplied to a second furnace. In the second furnace, the oxidizing calcination is performed under an oxidizing atmosphere, especially under air, which removes organic residual constituents.

In a preferred configuration, the overall calcining operation, however, can also be performed in a single furnace. In this case, on completion of the first thermal treatment, the atmosphere in the furnace is exchanged, by drawing off the reducing hydrocarbon atmosphere and replacing it with air or an oxygen-containing atmosphere. For such a furnace, corresponding inlets, gas connections, valves and an appropriate control system should be provided. The performance of the calcination in a single furnace is particularly advantageous in terms of process technology, since there is no operating step of transporting the reduced zeolite to a further furnace.

A particularly advantageous zeolite has been found to be a zeolite of the beta type (framework structure designation: BEA) or of the ZSM-5 type (framework structure designation: MFI). Further suitable zeolites have been found to be faujasite, ferrierite, Y, ZSM-20, MCM-41, chabazite and SABO. Regarding the general nomenclature of zeolites, reference is made here to Kirk-Othmer, "Encyclopedia of Chemical Technology", 3rd ed., Vol. 15, John Wiley & Sons, New York, 1981, p. 640-669. For classification of the zeolites, reference is also made to the article "Chemical Nomenclature and Formulation of Compositions of Synthetic And Natural Zeolites" by R. M. Barrer, Pure Appl. Chem. 51 (1979), p. 1091-1100. The structure of individual zeolites can also be taken, more particularly, from "Zeolite Atlas: Atlas of Zeolite Framework Types", 5th ed., Ch. Baerlocher, W. M. Meier and D. H. Olson, Amsterdam, Elsevier (2001).

For the ion exchange of the zeolite, there are in principle various processes. These involve exchanging the cations of potassium, sodium or calcium causally incorporated in the zeolite with the desired cations, for example of iron. This is easily possible in principle since the cations in the zeolite are held merely by an ionic interaction with the anionic structure. Ion exchange by iron can be effected, for example, by means of sublimation from iron chloride, by means of solid impregnation or by means of liquid ion exchange from a corresponding solution.

For an Fe ion-exchanged zeolite, the literature finds SCR activity to be dependent on the production operation or on the synthesis operation. In-house studies surprisingly show that the SCR activity of a zeolite catalyst produced as described in the present case is constantly high, irrespective of how the Fe ion-exchanged zeolite has been synthesized. It is apparent that the reduction in a hydrocarbon atmosphere, irrespective of the synthesis operation or of the ion exchange operation, always leads to a comparable reduction and stabilization of the iron with an oxidation state of +2 and/or to a stable high dispersity, the formation of Fe clusters being blocked.

The zeolite preferably contains iron with a proportion between 3 and 7% by weight. In this range, the desired catalytic activity is attained.

The object directed to a catalyst is achieved in accordance with the invention by an SCR-active zeolite catalyst which has been produced by the aforementioned process. Such a zeolite catalyst with a correspondingly calcined catalyst composition contains an Fe ion-exchanged zeolite where the Fe ions are present predominantly with an oxidation state of less than +3 and/or with a high dispersity. As mentioned, the latter can be demonstrated experimentally by means of UV-VIS spectroscopy. It has been found that the UV-VIS absorption of a corresponding sample of the inventive catalyst within a wavelength range between 400 nm and 600 nm has been permanently reduced compared to comparably produced samples without reduction in a hydrocarbon atmosphere. The dispersity of the iron is accordingly increased correspondingly. Large Fe clusters are distinctly reduced. A zeolite catalyst produced in such a way differs in this respect from the prior art in that the conversion of the Fe ions to the higher oxidation state of +3 and/or the formation of Fe clusters has been blocked.

At the time of the application, it is not possible to foresee which production processes beyond the process claimed can produce an SCR-active zeolite catalyst having the property mentioned. An SCR-active zeolite catalyst with a calcined catalyst composition comprising an Fe ion-exchanged zeolite where the Fe ions are present predominantly with an oxidation state of less than +3 and/or with a high dispersity according to the UV-VIS spectra, and wherein a conversion of the Fe ions to the higher oxidation state of +3 and/or the formation of Fe clusters is blocked, is therefore considered to be patentable in its own right.

The chosen wording of "blocking of the conversion of the Fe ions to the higher oxidation state of +3 and/or of the formation of Fe clusters" in this context encompasses slowed kinetics, and likewise an increase in an activation energy. The term "blocking" also encompasses an irreversible reduction of the iron to the oxidation state of +2 or of less than +3. The observable property of the newly specified catalyst can also be described in that the adsorption site of the iron on the zeolite is permanently stabilized, such that the dispersity is preserved. The properties mentioned can each individually be used entirely independently or in combination to describe the catalyst.

The property which distinguishes the zeolite catalyst specified from the prior art can finally also be observed and worded in terms of the fact that the calcined catalyst composition present in a pale yellow to beige base color corresponding to the present low oxidation state of the Fe ions, on heating to a temperature up to 900° C. with simultaneous air flow at a space velocity of 10 000 l/h, does not exhibit any color change even after one hour. A comparable catalyst composition which is reduced conventionally by means of forming gas or CO, under the same experimental conditions, after only a few minutes exhibits a color change to a rust-red base color corresponding to the higher oxidation state of the Fe ions of +3 or a reduced dispersity.

The zeolite used for the SCR-active zeolite catalyst may preferably be one of the aforementioned zeolites. More particularly, the zeolite is a zeolite of the beta type or of the MFI type.

In an advantageous configuration, the zeolite catalyst is present in the form of an extruded unsupported catalyst.

Further studies have shown that the invention can also be extended to further ion-exchanged zeolites. Correspondingly, an ion-exchanged zeolite of the generic type is first subjected in a reducing hydrocarbon atmosphere to a first thermal treatment within a range between 300° C. and 600° C., which reduces the oxidation state of the ions introduced and/or increases the dispersity of these ions on the zeolite, then the reduced zeolite is subjected in an oxidizing atmosphere to a second thermal treatment between 300° C. and 600° C., which oxidatively removes hydrocarbon residues and/or carbon residues, and the zeolite is calcined during the first and second thermal treatments to give a catalyst.

For ion exchange, as well as the preferred iron, advantageous metals with regard to the aforementioned catalytic activity have been found to be those from the group comprising Cu, Hf, La, Au, In, V, lanthanides and transition metals of group VIII of the periodic table. More particularly, preference is given not only to iron but also to copper, cerium, hafnium, lanthanum, platinum, silver, indium, vanadium, ruthenium and osmium. These metals are then present as metal cations in the zeolite, in which case the statements made for iron can be applied correspondingly to these cations.

Accordingly, the oxidation state of the metal ions will be reduced and/or the dispersity thereof on the zeolite will be increased during the first, reducing thermal treatment.

As already stated, due to an as yet undetermined reaction with the hydrocarbons or with decomposition products of the hydrocarbons during the calcining operation in a temperature range between 300° C. and 600° C., the aforementioned metal ions bound to the zeolite are stabilized in the reduced oxidation state and/or the fine distribution thereof achieved on the surface of the zeolite. Reoxidation in an oxidizing atmosphere or renewed formation of clusters on the surface, more particularly even under SCR conditions and high temperatures, is blocked. The coordination site of the bound metal cation on the zeolite is highly complex. Neither the exact lattice structure nor the chemical environment of the bound metal ions can be determined exactly. More particularly, the oxidation state under these conditions can no longer be considered to be an integer within the anionic structure of the zeolite; instead, fractional oxidation states are discussed.

Accordingly, the invention also encompasses an SCR-active zeolite catalyst with a calcined catalyst composition comprising an ion-exchanged zeolite where the ions are present predominantly with an oxidation state reduced by reduction and/or on the zeolite with high dispersity, a conversion of the ions to the higher oxidation state and/or a reduction in the dispersity being blocked. The metal ions used are preferably metals from the group comprising Cu, Hf, La, Au, In, V, lanthanides and transition metals of group VIII of the periodic table. More particularly, preference is given not only to iron but also to copper, cerium, hafnium, lanthanum, platinum, silver, indium, vanadium, ruthenium and osmium. Such a catalyst, more particularly, does not exhibit any color change which would be attributable to a change in the oxidation state or in the dispersity even when subjected to air flow at relatively high temperatures (above 700° C.).

BRIEF DESCRIPTION OF THE DRAWINGS

Embodiments of the invention are illustrated in detail with reference to a drawing and the examples which follow. The drawings show.

DETAILED DESCRIPTION

EXAMPLE 1a

Figure 1:
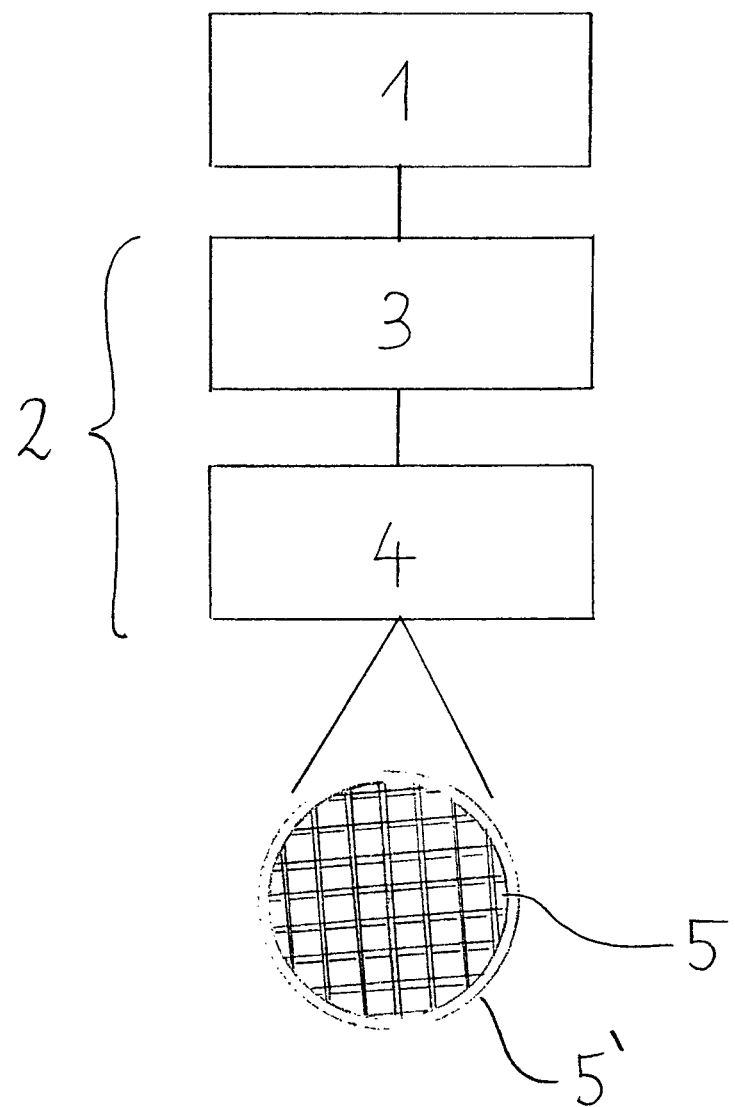
FIG. 1 a schematic flow diagram for the production of an SCR-active zeolite catalyst and FIG. 2 in a graph for various catalysts, a comparison of the temperature-dependent conversion rate for NO in the presence of ammonia.

FIG. 1 shows, by a schematic flow diagram, the production of an SCR-active zeolite catalyst according to an illustrative embodiment. In a first step, 1, a pulverulent Fe ion-exchanged synthetic MFI zeolite with a proportion of 3% by weight of iron is processed to give a plastic and free-flowing composition. For this purpose, the pulverulent MFI zeolite is mixed with glass fibers and likewise pulverulent boehmite and, with addition of cellulose, a commercial plasticizer and polyethylene oxide as an organic assistant, processed in an aqueous acidic solution having a pH of <5 to give the plastic and free-flowing mixture. The plastic mixture is subsequently extruded to give a honeycomb catalyst body permeated by channels and having a round cross section and a cell density of 300 cpsi (cells per square inch). Subsequently, the catalyst body is dried. The unsupported catalyst has a contact area with a diameter of about 2.5 cm (1 inch) and a flow length of about 7 cm.

Subsequently, the unsupported catalyst produced in this way is subjected to a calcination step 2. For this purpose, the catalyst body is subjected in a furnace under an $N_2$ atmosphere to a first thermal treatment 3. The catalyst body is heated to a temperature of 600° C. and kept there for a period of 1.5 hours. Subsequently, the catalyst body is cooled and withdrawn from the furnace at room temperature.

In the course of the first thermal treatment 3 in an inert gas atmosphere, the cellulose and the polyethylene oxide introduced as an organic plasticizer decompose as a result of pyrolysis to gaseous hydrocarbons, as a result of which a reducing hydrocarbon atmosphere forms in the furnace. Under these conditions, iron present in the MFI zeolite is reduced gradually to iron with an oxidation state of +2, or at least to a fractional oxidation state of less than +3, and/or the dispersity of the iron on the zeolite is increased. The temperature profile selected achieves the effect that iron in the reduced form or the high dispersity of the iron is stabilized, which is accomplished crucially through the influence of the hydrocarbons present in the atmosphere. The thermal treatment additionally drives water out of the catalyst body and achieves solidification of the catalyst composition. During the reducing calcination, the catalyst composition at the same time takes on a pale yellow to beige base color which indicates presence of iron in the +2 oxidation state and/or an increase in the dispersity. This color may be masked by the decomposition products of the organic polymers, such that the catalyst body appears black overall.

Subsequently, the reduced zeolite catalyst, for performance of a second thermal treatment 4, is introduced into a second furnace in which the atmosphere used is air. The catalyst body is again brought therein to a temperature of about 600° C. and kept there for a period of about 50 minutes. During this time, the decomposition products present in the catalyst and the original organic polymers of the cellulose and of the plasticizer still present are oxidized and finally removed. The catalyst composition solidifies further. At the end of the second thermal treatment 4, the zeolite catalyst now visibly has the pale yellow to beige base color mentioned.

Subsequently, the zeolite catalyst is cooled and removed from the second furnace. The result is the finished zeolite catalyst, which is in the form of a honeycomb unsupported catalyst 5, and is prepared for the use thereof for degradation of nitrogen oxides by the SCR process.

EXAMPLE 1b

In an alternative variant, thermal treatments 3 and 4 are performed in a common furnace. In this case, on completion of the first thermal treatment 3, the catalyst body is cooled to a temperature of below 400° C., then the reducing hydrocarbon atmosphere is drawn off and air is let into the furnace. This is then followed immediately by the second thermal treatment 4, which is run through analogously to example 1a.

EXAMPLE 1c

According to example 1a, a plastic and free-flowing composition is produced. A catalyst body composed of cordierite of the same dimensions and the same cell density as an inert support body is coated with the plastic composition. Subsequently, the coated support body is subjected to the further process steps 3 and 4 according to example 1a. The result is a coated catalyst body 5'.

In an experiment, the unsupported catalysts 5 and 5' produced according to examples 1a, 1b and 1c are heated to 900° C. and subjected to air flow at a space velocity of 10 000 1/h for 2 hours. The unsupported catalysts 5 and 5' do not exhibit any color change in the course of this. They retain the inherent pale yellow to beige base color. In other words, iron of the +2 oxidation state and/or the high dispersity of the iron is stabilized permanently by the reducing calcination according to the first thermal treatment 3. Even under an oxidizing atmosphere, such as air, no oxidation of the iron of the +2 oxidation state to iron of the +3 oxidation state takes place, and no large Fe clusters form. Any oxidation would lead immediately to a color change to a rust-red base color, as is typical of iron in the +3 oxidation state. This color is typical of rust, iron being present principally in the form of an $Fe_2O_3$. The same applies to iron oxide clusters present.

EXAMPLE 2

For comparison with this, a zeolite catalyst produced identically according to process step 1 of example 1a is manufactured. This is then calcined according to conventional technology under air at temperatures above 500° C.

EXAMPLE 3

According to example 1a, a catalyst body is again extruded with a round cross section, a cell density of 300 cpsi, with a contact area having a diameter of 2.5 cm and a flow length of about 7 cm. Instead of a zeolite of the MFI type, however, the zeolite used is an Fe ion-exchanged synthetic zeolite of the beta type. A zeolite of the beta type differs from a zeolite of the MFI type by a different characteristic three-dimensional structure.

Subsequently, for catalysts 1a, 2 and 3, the catalytic activity for conversion of NO in the presence of ammonia is determined For this purpose, catalysts 1a, 2 and 3 are each subjected to a flow of a standard gas composed of nitrogen with a proportion of 600 ppm of NO at a standardized space velocity of 25 000 1/h. In each case, the proportion of NO before and after flow through the catalyst body is determined and this is used to determine the conversion based on the proportion of NO upstream of the catalyst Ammonia $NH_4$ is supplied to the standard gas as a reducing agent with a stoichiometry factor of $\alpha=0.9$, i.e. in a slightly substoichiometric amount in relation to the proportion of NO. Subsequently, the respective conversion is determined for various temperatures below 300° C.

The same experiment is repeated for an unsupported catalyst of the same geometry, which comprises a catalyst composition composed of titanium dioxide with additions of oxides of tungsten and vanadium. The catalyst is referred to hereinafter as TiMoV catalyst.

The result of the studies is shown in FIG. 2. A graph 10 shows plots of each of the conversions of NO normalized to the comparative catalyst 2 against temperature 14. The graph 10 shows the measurements for catalyst 1a (MFI) according to curve 15, for catalyst 3 (beta) according to measurement curve 17 and for comparative catalyst 2 according to measurement curve 16. As a result of the normalization, the latter is calculated as a straight line of value 1.

According to the graph 10 in FIG. 2, it is evident that the unsupported catalyst 1a obtained by reduced calcination, zeolite MFI (measurement curve 15), in the low-temperature range of below 300° C., displays a distinct improvement in catalytic activity with regard to the selective catalytic reduction of NO compared to a conventionally produced catalyst of the same composition. The conversion is increased in this case. The oxidized unsupported catalyst 3, zeolite beta (measurement curve 17), shows a still further-improved catalytic activity.

In the temperature range above 300° C., the achieved conversions of NO and the catalytic activities of catalysts 1a and 3 approach those of comparative catalyst 2.

FIG. 2 shows that, an unsupported catalyst produced according to embodiments of the process according to the invention has an excellent catalytic activity with regard to the selective catalytic reduction of nitrogen oxides in the low-temperature range below 300° C. The permanent stabilization of the iron in the +2 oxidation state or in a fractional oxidation state of less than +3 and/or the permanently high dispersity of the iron on the zeolite makes an SCR-active zeolite catalyst produced in such a way outstandingly suitable in this respect for use for nitrogen oxide reduction in the exhaust gases of internal combustion engines operated with excess air, as is the case particularly for a diesel engine. While the catalytic activity in the low-temperature range in the case of conventional zeolite catalysts depends crucially on the proportion of $NO_2$, this is not the case for the zeolite catalyst specified in the present case. FIG. 2 shows an outstanding catalytic activity of the catalysts for degradation of NO, specifically in the absence of $NO_2$. An oxidation catalyst which is usually connected upstream for conventional zeolite catalysts, more particularly also for Fe ion-exchanged zeolite catalysts, and increases the proportion of $NO_2$ in the emitted nitrogen oxides within a low-temperature range can thus be dispensed with entirely for the zeolite catalyst specified in the present case. This means not just a saving of construction space. In fact, the invention gives a considerable cost advantage since the oxidation catalysts needed generally contain noble metals and are therefore expensive.

LIST OF REFERENCE NUMERALS

1 Production of extrudable composition
2 Calcination
3 First, reducing thermal treatment
4 Second, oxidizing thermal treatment
5 Unsupported catalyst, extruded
5' Unsupported catalyst, coated
10 Graph
12 NOx conversion
14 Temperature
15 Measurement curve for MFI catalyst 1a
16 Measurement curve for comparative catalyst 2
17 Measurement curve for beta catalyst 3

The invention claimed is:

1. A process for producing an SCR-active zeolite catalyst, characterized in that
  an Fe ion-exchanged zeolite is first subjected in a reducing hydrocarbon atmosphere to a first thermal treatment within a range between 300° C. and 600° C., which at least one of (i) reduces the oxidation state of the Fe ions and (ii) increases the dispersity of the Fe ions on the zeolite,
  then the reduced zeolite is subjected in an oxidizing atmosphere to a second thermal treatment between 300° C. and 600° C., which oxidatively removes at least one of (i) hydrocarbon residues and (ii) carbon residues, wherein the zeolite is calcined during the first and second thermal treatments to produce the catalyst.

2. The process as claimed in claim 1, characterized in that a temperature of 500° C. is exceeded for a period of more than 50 minutes during the first thermal treatment.

3. The process as claimed in claim 1, characterized in that the zeolite at the end of the first thermal treatment is cooled to a temperature below 400° C.

4. The process as claimed in claim 1, characterized in that the hydrocarbon atmosphere contains less than 1% by volume of oxygen.

5. The process as claimed in claim 1, characterized in that the first thermal treatment is performed in an inert gas atmosphere to which hydrocarbons are supplied for reduction.

6. The process as claimed in claim 5, characterized in that the hydrocarbons supplied are at least one of (i) organic polymers and (ii) biopolymers which are converted to gaseous decomposition products during the first thermal treatment.

7. The process as claimed in claim 6, characterized in that the hydrocarbons supplied are at least one of polyethylenes, polyglycols and cellulose.

8. The process as claimed in claim 1, characterized in that the zeolite is preliminarily processed with addition of an organic plasticizer to give a free-flowing composition, and the first thermal treatment is performed in an inert gas atmosphere, the organic plasticizer releasing hydrocarbons into the inert gas atmosphere as a result of pyrolysis.

9. The process as claimed in claim 8, characterized in that the plasticizer used is at least one of a polyethylene glycol, a polyethylene oxide and cellulose.

10. The process as claimed in claim 8, characterized in that the free-flowing composition is extruded to give an unsupported catalyst, and the unsupported catalyst is subjected to the first and second thermal treatments.

11. The process as claimed in claim 8, characterized in that a support body is coated with the free-flowing composition, and the coated support body is subjected to the first and second thermal treatments.

12. The process as claimed in claim 1, characterized in that the second thermal treatment is performed under air.

13. The process as claimed in claim 1, characterized in that the first and second thermal treatments are performed in immediate succession with exchange of gas.

14. The process as claimed in claim 1, characterized in that the zeolite used is a zeolite of the beta or MFI type.

15. The process as claimed in claim 1, characterized in that the zeolite contains between 3 and 7% by weight of iron.

\* \* \* \* \*